United States Patent
Croibier

(10) Patent No.: US 8,439,068 B2
(45) Date of Patent: May 14, 2013

(54) FLUID FLOW CONTROL VALVE

(75) Inventor: Denis Croibier, Brezolles (FR)

(73) Assignee: PRODECFU, Evreux (FR)

( * ) Notice: Subject to any disclaimer, the term of this patent is extended or adjusted under 35 U.S.C. 154(b) by 1104 days.

(21) Appl. No.: 12/066,560

(22) PCT Filed: Sep. 11, 2006

(86) PCT No.: PCT/FR2006/050861
§ 371 (c)(1),
(2), (4) Date: Mar. 6, 2009

(87) PCT Pub. No.: WO2007/031672
PCT Pub. Date: Mar. 22, 2007

(65) Prior Publication Data
US 2009/0184271 A1    Jul. 23, 2009

(30) Foreign Application Priority Data
Sep. 13, 2005    (FR) ..................................... 05 52756

(51) Int. Cl.
*F16K 31/12* (2006.01)
*F16K 31/36* (2006.01)
*E03B 1/00* (2006.01)
*G05D 16/06* (2006.01)

(52) U.S. Cl.
USPC .......................................... 137/486; 137/613

(58) Field of Classification Search .................. 137/486, 137/312, 613; 251/30.01, 30.02, 30.03, 33, 251/30.04; 73/40, 40.5 R
See application file for complete search history.

(56) References Cited

U.S. PATENT DOCUMENTS

| | | | | |
|---|---|---|---|---|
| 2,562,315 A | * | 7/1951 | Kempton | 251/30.03 |
| 2,644,476 A | * | 7/1953 | Smith | 137/88 |
| 3,344,807 A | * | 10/1967 | Lehrer et al. | 137/557 |
| 3,550,623 A | * | 12/1970 | Katchka | 137/613 |
| 3,835,878 A | * | 9/1974 | Braidt et al. | 137/246.13 |
| 5,449,142 A | * | 9/1995 | Banick | 251/30.04 |
| 5,503,362 A | | 4/1996 | Kim | |
| 5,687,759 A | * | 11/1997 | Tan | 137/486 |
| 6,382,586 B1 | | 5/2002 | Wilson et al. | |

FOREIGN PATENT DOCUMENTS

EP    0 964 235 A1    12/1999

* cited by examiner

*Primary Examiner* — Len Tran
*Assistant Examiner* — Chee-Chong Lee
(74) *Attorney, Agent, or Firm* — Sughrue Mion, PLLC

(57) ABSTRACT

A fluid-flow control valve includes an inlet (E) for connecting to a feed duct; an outlet (S) for connecting to an evacuation duct; a valve member (1) that, at rest, bears against a valve seat (2) to isolate the inlet (E) from the outlet (S); and an actuator mechanism (5, C) for moving the valve member (1). The actuator mechanism includes a chamber (C), which communicates with the inlet (E) via a hole (11) and is disposed relative to the valve member (1) on its side facing away from the seat (2), in such a manner as to urge the valve member against its seat; and a bypass (5) that connects the chamber (C) to the outlet (S), the bypass being controllable between an open state for passing fluid, and a closed state.

11 Claims, 5 Drawing Sheets

FLUID FLOW CONTROL VALVE

CROSS REFERENCE TO RELATED APPLICATIONS

Figure 1:
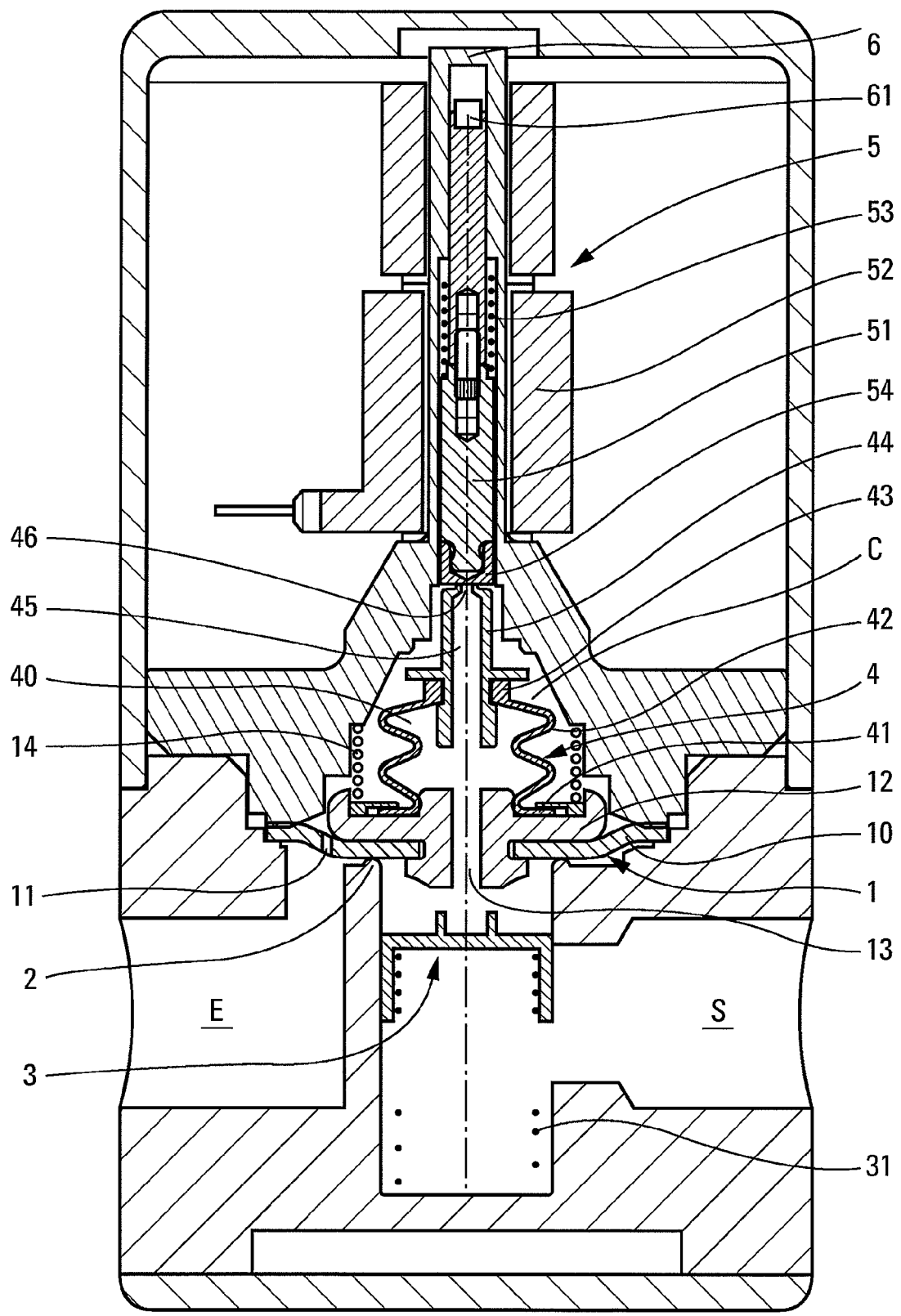

This application is a National Stage of International Application No. PCT/FR2006/050861 filed on Sep. 11, 2006, claiming priority based on French Patent Application No. 0552756, filed Sep. 13, 2005, the contents of all of which are incorporated herein by reference in their entirety.

The present invention relates to a fluid-flow control valve for mounting in a fluid feed line. The fluid can be a liquid or a gas. The valve is controlled in such a manner as to allow or to stop the flow of fluid through the valve. Such a fluid-flow control valve can be used in numerous fields of application in which a fluid of any kind is to be conveyed from one location to another via a line. The term "line" should be understood as any feed or delivery means such as ducts, tubes, etc.

Such a fluid-flow control valve generally comprises: an inlet for connecting to a feed duct; an outlet for connecting to an evacuation duct; a control valve member that, at rest, bears against a valve seat in such a manner as to isolate the inlet from the outlet; and actuator means for moving the valve member to establish fluid communication between the inlet and the outlet. This design is entirely conventional for a fluid-flow control valve. Amongst such valves, solenoid valves of the type including a chamber that communicates with the inlet via a hole of determined section have been known for some time, the chamber being disposed relative to the valve member on its side facing away from the seat, in such a manner as to urge the valve member against its seat. The solenoid valve also includes a bypass that connects the chamber to the outlet, the bypass being controllable between an open state for passing fluid, and a closed state, the bypass thus presents a through section that is greater than the through section of the hole, so as to cause the pressure in the chamber to drop on opening the bypass. The drop in pressure in the chamber occurs as a result of the fluid inside the chamber flowing through the bypass more rapidly than the fluid can penetrate into the chamber via the calibrated hole. The valve member, which is also subjected to the inlet fluid pressure, thus rises, lifting off its seat, and thereby freeing a communication passage for the fluid that can thus reach the outlet. This operating principle is conventional for a solenoid valve. Such a control valve thus fulfils a single function consisting of a binary (on/off) control over fluid flow.

An object of the present invention is to impart to such a control valve, other functions that are useful for reliable and safe operation of the line in which the control valve is mounted.

In an embodiment of the invention, the control valve also incorporates fluid-leak detector means that are suitable for detecting a fluid leak downstream from the valve member. The leak detector means are not merely added to a conventional control valve, but form an integral part thereof, so as to constitute a single unit only. In other words, the leak detector means cannot be separated from the control valve. Such a control valve of the invention thus fulfils two functions, namely: the conventional function of cutting off the flow of fluid; and the additional function of leak detection. Such a valve incorporating leak detection can serve to convey and to detect fluid in ducts, tubes, pipes, etc. It can also serve to test the leaktightness of receptacles, vessels, tanks, reservoirs, etc.

Document EP 0 964 235 A1 discloses a fluid-leak detector that includes a resilient plug that is suitable for being moved when subjected to a pressure difference. At the end of its stroke, the resilient plug establishes a contact that activates a bypass, making it possible to balance the pressures between the inlet and the outlet of the detector. However, the detector in that European document cannot under any circumstance cut off the flow of fluid when a leak is detected. To do this, it is necessary to mount a safety valve in the feed line equipped with the detector. Consequently, the leak detector is not incorporated at all in the safety valve.

In an advantageous embodiment, the detector means are coupled to the actuator means of the valve member, such that the actuator means form an integral part of the detector means when the valve is in leak-detection mode. The actuator means of the valve member are thus used firstly to control the valve member, and secondly to participate in detecting fluid leaks, if any. This dual use of the actuator means of the valve member constitutes an advantageous principal of the invention.

For a control valve using actuator means comprising a chamber and a bypass as mentioned above, it is advantageous for the leak detector means to comprise a detector member that is sensitive to the pressure difference between the inlet and the outlet, said detector member being subjected to the pressure existing in the chamber, and to the pressure existing in the outlet. The detector member preferably comprises an anchor ring that is secured to the valve member, an elastically-deformable membrane, and an endpiece that is remote from the ring, said endpiece being axially movable relative to the ring by deforming the membrane, the endpiece being provided with detector means that are suitable for detecting a predetermined position of the endpiece and for sending a trigger signal to the bypass so as to bring it into its open state. According to a particularly advantageous characteristic of the invention, the bypass is mounted on the endpiece. The endpiece preferably defines a through orifice that puts the chamber into communication with the outlet, the bypass including a ferromagnetic core that is slidably movable in a solenoid, the core being suitable for closing the through orifice of the endpiece while the solenoid is not powered, the core being provided with detector means that are suitable for detecting a predetermined position of the core and for sending a signal for powering the solenoid so as to move the core away from the endpiece and thus release the through orifice.

In another aspect of the invention, the valve member forms a through passage that puts the outlet into communication with the inside of the movable detector member disposed in the chamber.

In a practical embodiment, the valve member includes an elastically-deformable washer that is held in stationary manner around its outer periphery, one face of the washer facing both the inlet and the outlet, and bearing against the seat, while its other face faces the chamber, the hole passing through the washer from one face to the other. Advantageously, the valve member further includes a rigid bushing forming a through passage that puts the outlet into communication with the inside of the movable detector member, the movable detector member being secured to the bushing, the bushing being urged by a spring in such a manner as to push the washer against its seat.

In another advantageous aspect of the invention, the control valve further includes flow-rate control means in the outlet, the flow-rate control means sending a cut-off signal from the leak detector means when the flow rate reaches a predetermined value.

In brief, it can be said that a pressure difference between the inlet and the outlet is indicative of a leak in the outlet, or more generally downstream from the valve member. The pressure difference acts on the detector member of the leak detector means, given that the detector member is subjected on one side to the inlet pressure, and on the other side to the outlet pressure. As a function of the sensitivity of the detector member, it is possible to detect pressure differences in ranges that are very varied, corresponding to leaks that are very small or to leaks that are larger. It is even possible to use the leak detector means as a flowmeter when considering very large leaks. A very large leak may correspond to normal flow conditions of the valve. For a movable detector member, when said detector member reaches a predetermined position, a signal is given to the actuator means to balance the pressure on either side of the valve member. In practice, this is performed by opening the bypass. When the pressure balances on either side of the valve member, the bypass closes. Balancing the pressure enables the detector member to return simultaneously to its initial, rest position, in which it is not subjected to any pressure difference. If the leak persists, the movable detector member deforms once again as a result of a pressure difference developing again. Once more, as soon as the movable detector member reaches a predetermined position, the bypass opens in order to balance the pressures, and the detector member returns to its rest position. Thus, by observing that the bypass is actuated successively and/or periodically, it is possible to deduce that there is a leak downstream from the valve member. And, as a function of the frequency of operation of the bypass, or more generally of the actuator means of the valve member, it is possible to determine the magnitude of the leak, e.g. in terms of flow rate. After a certain number of actuations of the bypass, it is possible to decide that the bypass should no longer respond when the movable detector member reaches its predetermined position, such that the valve is then blocked in its closed position. It is thus possible not only to detect a leak, but also to stop the flow through the valve when a persistent leak is detected. Instead of the movable detector member, it is also possible to use a detector cell for detecting pressure difference.

Naturally, it is necessary for the pressure difference to which the leak detector means are sensitive to be less than the pressure difference that makes it possible to open the valve member.

Compared to the fluid-leak detector in document EP 0 964 235 A1, the detector means of the present invention are incorporated or integrated in a conventional fluid-flow control valve, and even use its actuator means. In the above-mentioned European document, the detector means are for mounting in a feed line that can also be equipped with a control valve, such that the detector means are completely separate from the control valve. In the present invention, the control valve and the detector means are incorporated, forming a single unit, and it is possible to use the detector means for cutting off the flow of fluid when a persistent leak is detected.

The invention is described more fully below with reference to the accompanying drawings which show two embodiments of the invention by way of non-limiting example.

Figure 2A:
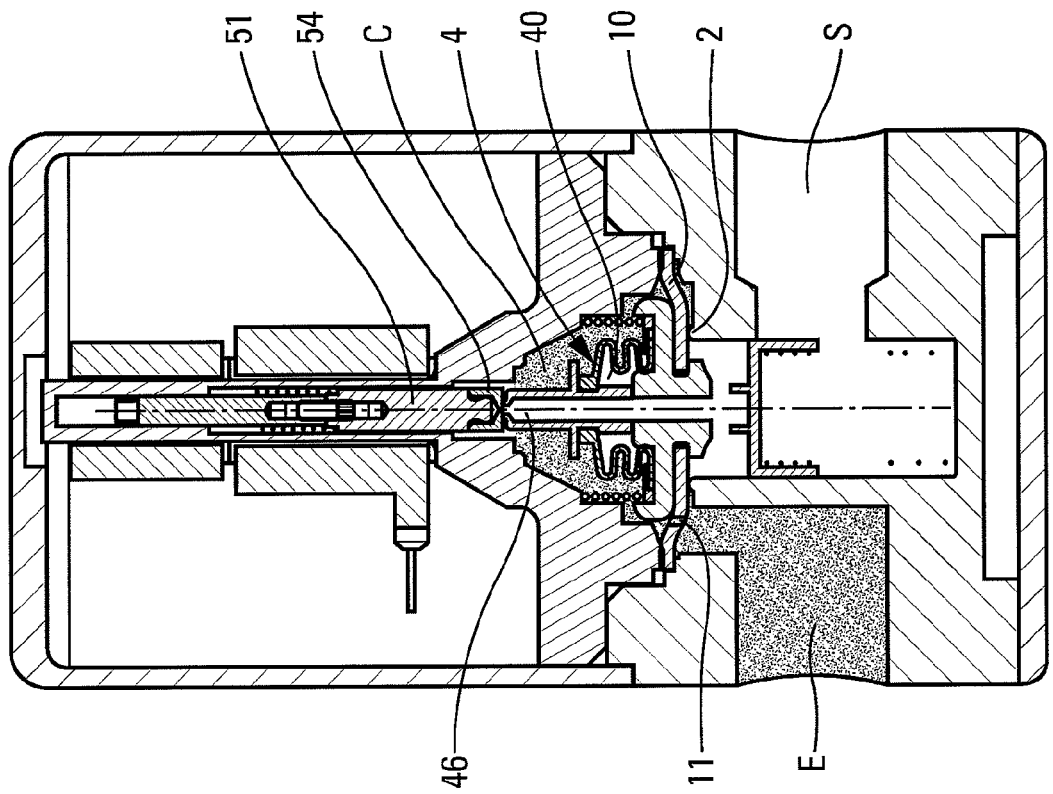
Figure 2B:
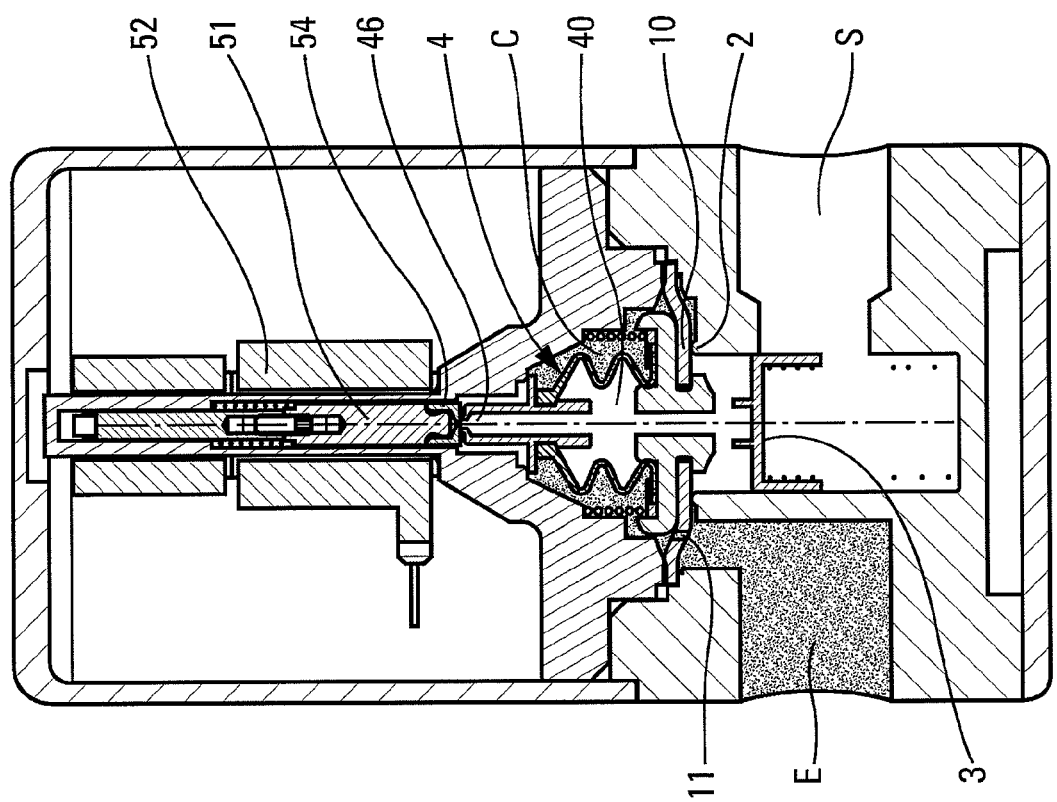
Figure 2C:
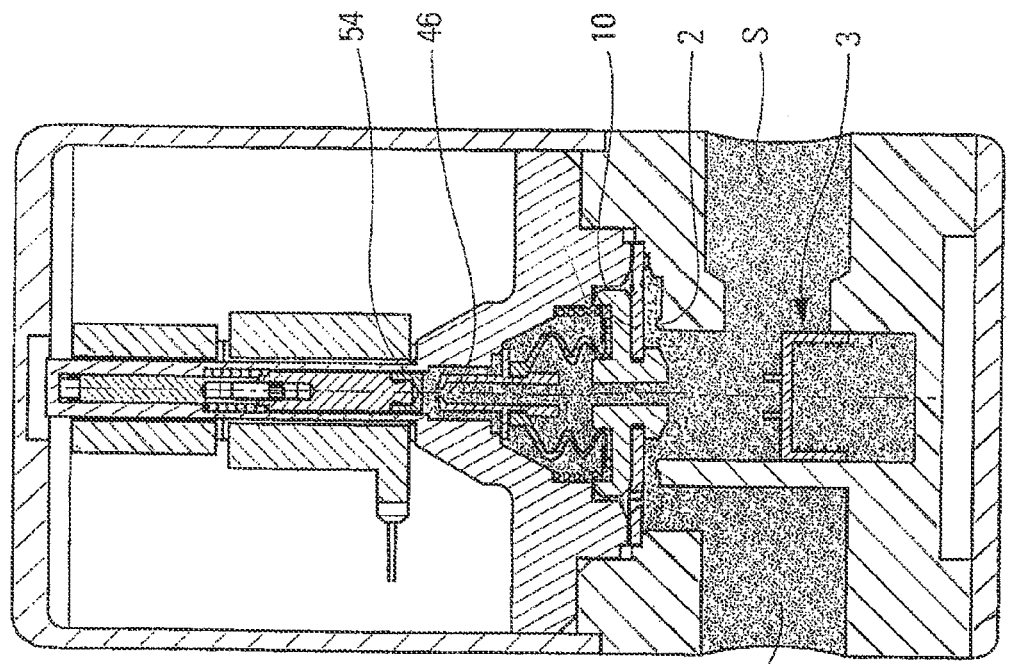
Figure 2D:
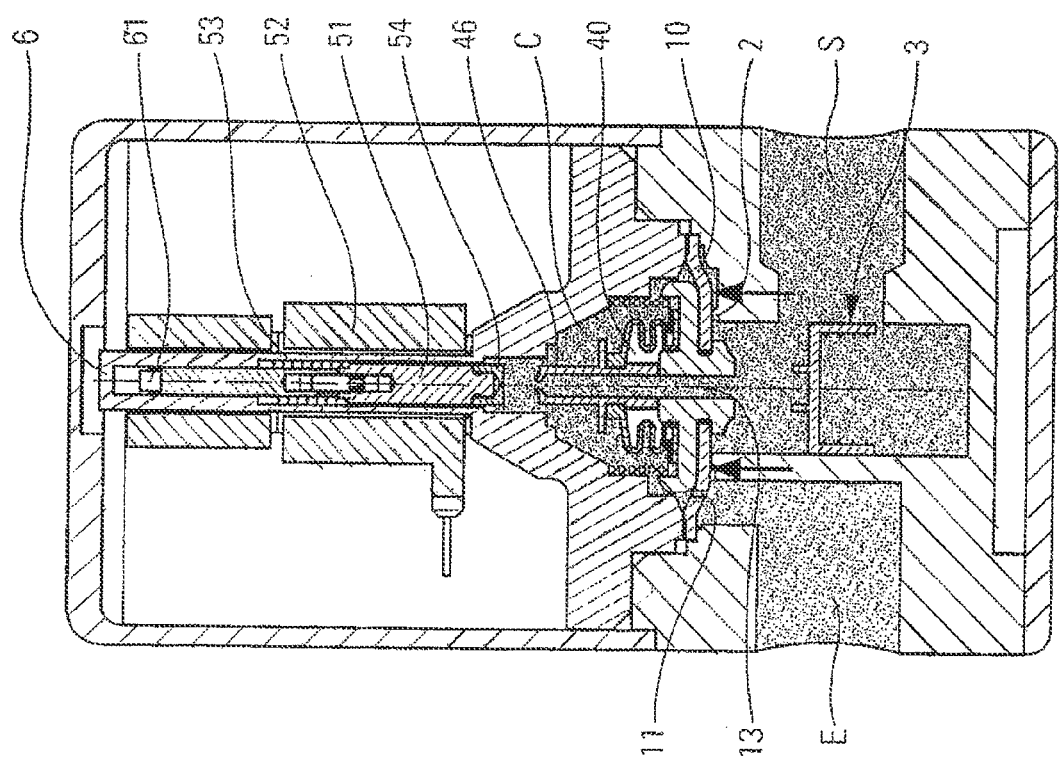
Figure 2F:
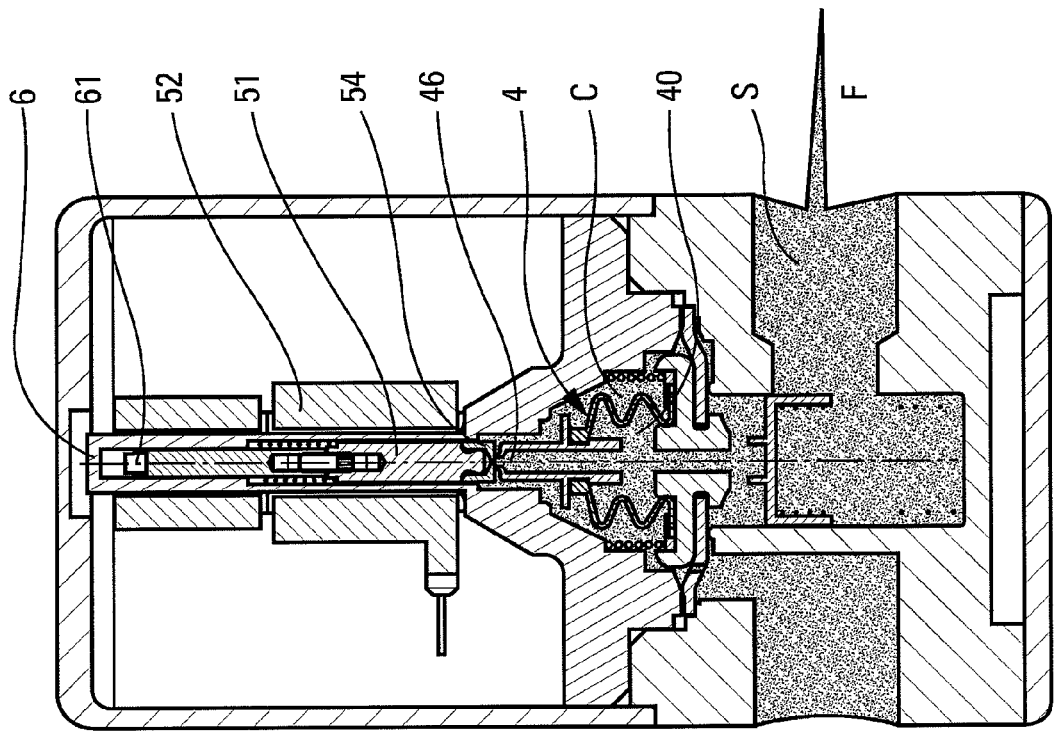
Figure 2E:
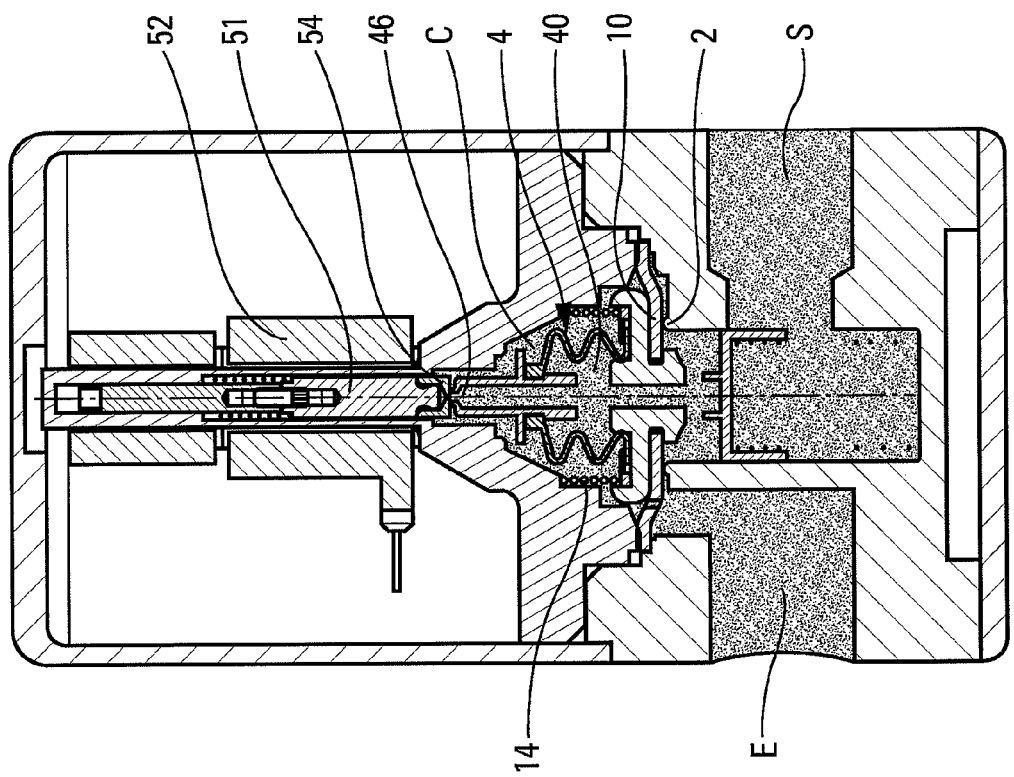
Figure 3:
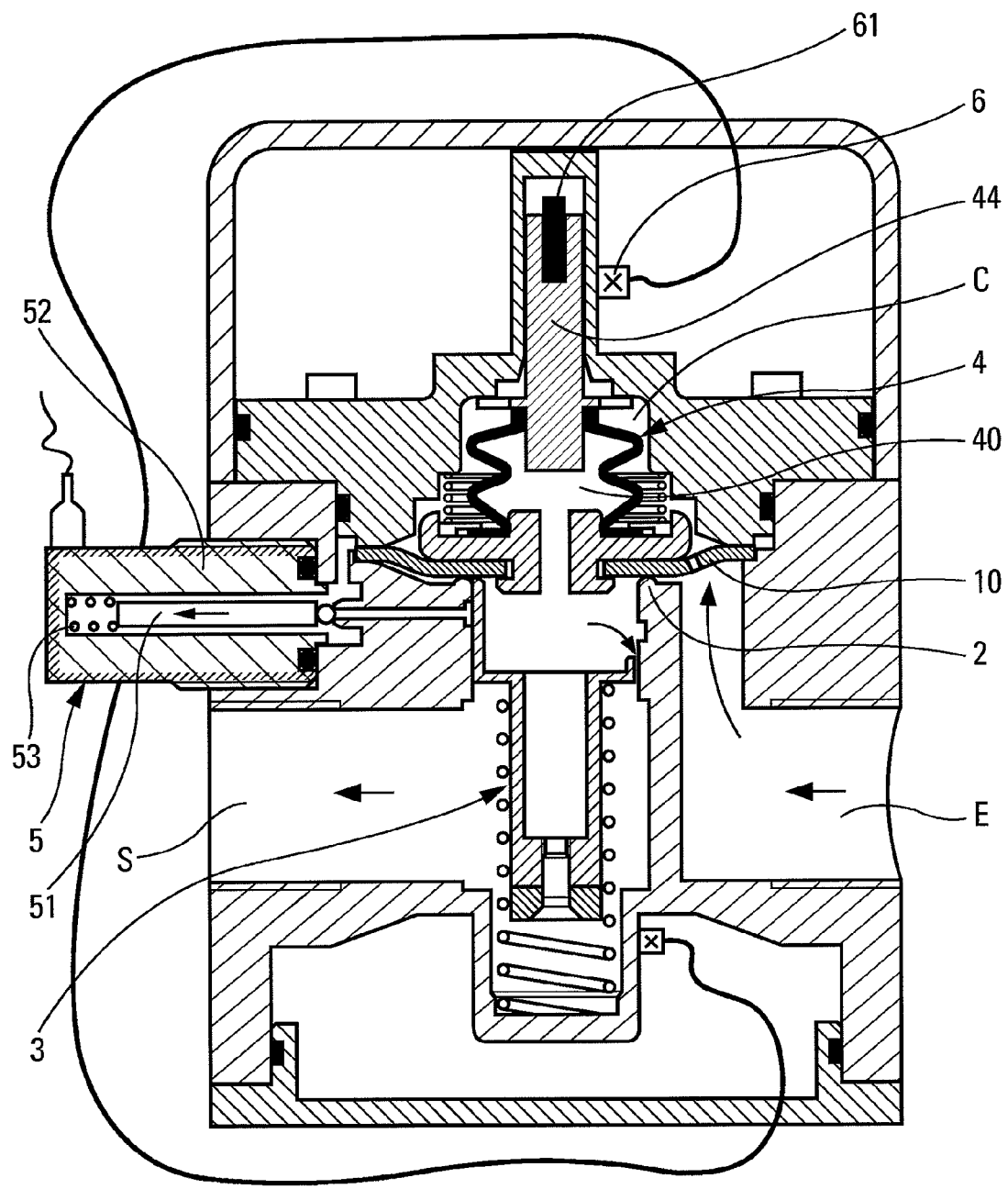

In the figures:

FIG. 1 is a vertical section view through a control valve constituting a first embodiment of the invention, showing it in the rest state;

FIGS. 2A, 2B, 2C, 2D, 2E, and 2F are views of the FIG. 1 valve during six operating-cycle stages; and FIG. 3 is another vertical section view through a control valve constituting a second embodiment of the invention.

Reference is made firstly to FIG. 1 in order to explain in detail the structure of the fluid-flow control valve constituting the first embodiment of the invention. The valve is a valve of the solenoid type, i.e. it is electrically powered to control its actuation. It is a particular type of solenoid valve that is described in detail below.

In conventional manner, the valve includes an inlet E and an outlet S that are separated by a valve member 1 that bears against a seat 2. At rest, as shown in FIG. 1, the valve member 1 bears in leaktight manner against the seat 2, thereby cutting off any fluid communication between the inlet and the outlet. The valve is thus in the closed state. The inlet E is for connecting to a feed duct (not shown) which can be of any kind. In addition, the outlet is for connecting to an evacuation or flow duct (not shown) which can also be of any kind. In this embodiment, the valve member 1 is made out of two parts, namely an elastically-deformable washer 10, and a rigid bushing 12. The elastically-deformable washer 10 is held in stationary manner at its outer periphery, and, at its center, it defines an opening having an edge. The bushing 12 is engaged with the edge of the opening of the washer 10, and also presents a through passage 13. The bushing 12 bears against a large fraction of the washer 10: however, the washer 10 is capable of being elastically deformed in its zone situated between its outer periphery and the location at which it comes into contact with the bushing 12. The valve member 1 is urged by a return spring 14 into the rest position, in which the washer 10 bears in leaktight manner against the seat 2. In the invention, the washer 10 is pierced with a hole 11 of predetermined small section.

Thus, while the valve member is at rest, the bottom face of the washer 10 faces both the inlet E and the outlet S: the bottom face of the washer being in contact with the inlet E at its outer periphery, and being in contact with the outlet S at its central portion in which the through passage 13 is formed. The inlet is separated from the outlet by the leaktight contact provided between the bottom face of the washer 10 and the seat 2.

In the invention, the outlet S can be provided with flow-rate detector means 3 that can, for example, be in the form of a float that is urged towards the valve member 1 by a return spring 31. Flow rate can be measured as a function of the position of the float 3. The measured flow rate value can be used to give an indication of the flow rate, or to trigger a particular operation of the valve, as described below.

Above the valve 1, the valve defines a chamber C that communicates with the inlet E via the hole 11. It can be said that the top face of the washer 10 faces the chamber C, as well as the bushing 12. Thus, at rest, the chamber C is subjected to the same pressure as the inlet E, as a result of the fluid communicating via the hole 11.

In the invention, the chamber C contains a detector member 4 that is in the general form of a deformable bellows that is suitable for being flattened or collapsed onto itself. The deformable detector member 4 comprises: an anchor 41 that is secured to the bushing 12; an elastically-deformable membrane 42; a top fastener neck 43, and an endpiece 44 that is engaged in the neck 43. The endpiece 44 can also be made integrally with the neck 43, the membrane 42, and the anchor 41. The endpiece 44 internally defines a duct 45 that ends at its top end with a through orifice 46. The deformable detector member 4 is disposed inside the chamber C and occupies a significant fraction thereof. The inside of the deformable detector member 4 defines a space 40 that communicates with the outlet S via the through passage 13 defined by the valve member 1. At its top end, the space 40 communicates with the chamber C via the duct 45 and the through orifice 46. However, in the rest position, as shown in FIG. 1, the through orifice 46 is closed by a stopper 54. Thus, in the rest position, the space 40 does not communicate with the chamber C. Given that the chamber C is at the same pressure as the inlet E, and that the space 40 is at the same pressure as the outlet S, the deformable detector member 4 constitutes an interface that is sensitive to the pressure difference existing between the inlet E and the outlet S. At rest, the pressure in the inlet E is normally equal to the pressure in the outlet S, such that the pressure difference is zero. Consequently, the deformable detector member 4 is not subjected to any pressure difference. In contrast, if a pressure difference exists between the inlet and the outlet, the deformable detector member 4 is subjected to said pressure difference, and thus deforms under the effect of said pressure difference. Naturally, the degree to which the deformable detector member 4 deforms depends on how stiff it is: thus, the stiffer the detector member 4, the less sensitive it is to small pressure differences, and vice versa. In this way, when the pressure inside the chamber C is greater than the pressure inside the space 40, the deformable detector member 4 deforms by collapsing, and that causes the endpiece to be moved downwards towards the through passage 13. In collapsing, the volume of the space 40 decreases and the volume of the chamber C increases. The through orifice 46 remains closed so long as the stopper 54 follows the movement of the endpiece 45. However, if the stopper 54 lifts off the orifice 46, fluid communication is thus established between the space 40 and the chamber C, causing the pressures in the inlet E and in the outlet S to come into balance. In this respect, it should be observed that the section of the hole 11 is substantially smaller than the section of the through orifice 46, and substantially smaller than the section of the through passage 13.

Instead of the bellows-shaped deformable detector member, it is also possible to use a piston that is urged towards a rest position by a spring or any return means. Thus, the detector member 4 can be movable or deformable depending on the application.

It is also possible to use a detector cell for detecting pressure difference.

The valve also includes control means 5 that are in the form of a bypass including a core 51 that is engaged inside a coil or solenoid 52. The core 51 is made of a ferromagnetic material that is sensitive to the field induced in the solenoid 52 when said solenoid is powered. The stopper 54 is mounted at the bottom end of the core 51, such that it can be moved when the solenoid 52 is powered. A return spring 53 urges the core 51 downwards, thereby urging the stopper 54 to bear against the through orifice 46 formed by the endpiece 45. Consequently, in the rest position, the stopper 54 is urged in leaktight manner against the through orifice 46, and this continues even when the deformable detector member 4 collapses onto itself.

The chamber C, together with the control means, form actuator means for actuating the valve member 1. Opening the through orifice 46 by activating the solenoid 52 causes the pressure in the chamber C to drop, such that the pressure in the inlet E can cause the valve member 1 to lift off its seat.

The valve of the invention also includes detector means 6 that make it possible to detect the position of the core 51 inside the solenoid 52. By way of example, the detector means are distance detector means that determine the distance to a magnet 61 that is mounted at the top end of the core 51. The detector means are adapted to detect a predetermined position of the core 51, and consequently of the stopper 54, inside the solenoid 52. When the core 51 reaches said predetermined position, a trigger or control signal is sent to the solenoid 52 which is then electrically powered, thereby moving the core 51 upwards inside the solenoid 52, against the force exerted by the return spring 53.

It should be observed that the general design of the control valve of the invention is that of a conventional solenoid valve using a valve member, a chamber placed behind the valve member, and a bypass for controlling actuation of the valve member. This is described below with reference to FIGS. 2A to 2F. However, the valve of the invention differs from a conventional valve in that it incorporates leak detector means that are embodied by the movable or deformable detector member 4 that is associated with the actuator means, namely the chamber C and the bypass 5. It is impossible to separate the component elements of the valve from those useful for making the detector means. This is why it can be said that the detector means are incorporated in the valve.

FIG. 2A shows the FIG. 1 valve in its rest state before opening, with fluid in the inlet E and in the chamber C, and no fluid in the space 40 nor in the outlet S. The fluid in the inlet E and in the chamber C is not yet under pressure. Thus, there is no pressure difference between the inlet E and the outlet S, and the deformable detector member 4 is not under stress. It can therefore remain in the rest state. The through orifice 46 is closed by the stopper 54 that is pushed against the orifice by the return spring of the core 51. The valve member is closed, bearing against its seat 2 in leaktight manner.

Reference is made below to FIG. 2B. On putting the fluid in the inlet E under pressure, the pressure also reaches the chamber C via the orifice 11. On the other side, the outlet S remains at atmospheric pressure. Consequently, a large pressure difference is created in the chamber C, thereby deforming the detector member 4 which compresses onto itself. The space 40 is thus at its minimum volume. The endpiece of the detector member 4 even comes into abutment against the valve member. The through orifice 46 is still closed by the stopper 54 that is pushed by the core 51. The valve continues to remain closed.

Reference is made below to FIG. 2C. On powering the solenoid 52, the core 51 is moved upwards against the force exerted by the return spring 53. This causes the stopper 54 to lift off the through orifice 46, such that fluid communication is established between the chamber C and the space 40. The fluid can thus flow through the through orifice 46, the space 40, and the through passage 13. However, given that the section of the orifice 46 and of the passage 13 is substantially greater than the section of the hole 11, it follows that the pressure inside the chamber C and inside the space 40 drops suddenly, thereby causing the valve member to rise, lifting off the seat 2.

This is shown in FIG. 2D, in which it can clearly be seen that the washer 10 has lifted off the seat 2, and that the through orifice 46 is not closed by the cap 54. The fluid can thus flow from the inlet E to the outlet S via the open valve member. This corresponds to the normal open position of the valve. It should be observed that the float 3 is moved downwards under the effect of the flow of fluid coming from the inlet E. The float 3 is lower in FIG. 2D than in FIG. 2C: this is explained by the fact that the flow rate is greater when the valve is open.

FIGS. 2A to 2D are illustrative of a normal operating cycle of the control valve of the invention and of any conventional valve or solenoid valve using a chamber placed behind the valve member, with a bypass for actuating the valve member.

Reference is made below to FIGS. 2E and 2F to explain how the valve operates in leak detection mode. Starting from FIG. 2D, the valve is closed by cutting off the power supply to the solenoid 52. This causes the core 51 to be released, and causes the stopper 54 to be repositioned on the orifice 46 so as to close it. From that moment, the pressure in the chamber C is once again equal to the pressure in the inlet E, and the pressure in the space 40 is equal to the pressure in the outlet S. As a result, the return spring 14 urges the valve member into its rest position in which the washer 10 comes into leaktight contact against the seat 2. This corresponds to FIG. 2E. In the absence of any leak in the outlet S, the valve remains in the closed state.

In contrast, if a leak is detected in the outlet S (represented by F in FIG. 2F), a pressure difference is created and the deformable detector member 4 is directly subjected to said pressure difference, as described above. As a result, the deformable detector member 4 collapses as in FIG. 2B, given that the pressure in the chamber C is greater than the pressure in the space 40. The deformable detector member 4 thus deforms until it reaches a certain predetermined state. The predetermined state can easily be measured as a function of the distance traveled by the through orifice 46. Given that the core 51 follows the movement of the orifice 46, the predetermined deformation state of the membrane of the deformable detector member 4 can be measured by the movement of the core 51. It is here that the detector means 6 are used, for measuring a predetermined position of the core 51 by detecting a distance relative to the magnet 61 that is mounted on the core 51. Thus, when the magnet 61 moves a predetermined distance away from the detector means 6, a control signal is sent to the solenoid 52 which is then powered, thereby causing the stopper 54 to lift off the orifice 46, as in FIG. 2C. However, the pressure difference created by the leak F is so small that it does not enable the valve member to lift off its seat. The valve therefore remains closed and the pressure is compensated merely by means of the bypass, i.e. by opening the orifice 46. When the pressure difference is eliminated, i.e. the pressure in the inlet is in balance with the pressure in the outlet, the solenoid 52 ceases to be powered, and the stopper 54 returns into sealing contact against the orifice 46. The position shown in FIG. 2F is reached once more. The solenoid will have been powered for a time period of about a few milliseconds. If the leak F persists, the deformable detector member 4 deforms once again, taking with it the core 51 and the magnet 61. When the magnet 61 reaches the predetermined detection position, a new control signal is sent to the solenoid 52, which then causes the stopper 54 to lift off the orifice 46. Pressure is once again balanced, such that the pressure difference is eliminated. The solenoid 52 is thus powered repeatedly in cycles for as long as the leak F persists. It is thus possible to detect a leak F in the outlet S by detecting repeated and cyclic activation of the bypass of the valve.

Provision can even be made to stop powering the bypass after a certain number of activations, e.g. ten or twenty, so as not to balance the pressure in the outlet S every time. The extent of the leak F is thus minimized.

It can also be envisaged to power the solenoid for a period of time that is greater than a few milliseconds, e.g. a few seconds. Either way, it is possible to measure the period of time between the solenoid ceasing to be powered and the next time it is powered. This gives an indication of the frequency of operation of the solenoid, which frequency can be associated with the variation in volume of the movable detector member in order to provide a value for the flow rate.

It should be observed that in the valve constituting the first embodiment of the invention, the conventional actuator means of the valve are also used by the leak detector means to balance the pressure after a small pressure difference. More precisely, the bypass of the conventional valve forms an integral part of the detector means constituted by the deformable detector member 4 positioned in the chamber C. It can even be said that the bypass is formed both by the endpiece of the deformable detector member 4, and by the actuator means of the valve. It follows that the detector means are intimately incorporated in the valve, in such a manner that they cannot be separated therefrom. It is precisely in this aspect that an advantageous principle of the invention resides.

Reference is made below to FIG. 3 which shows a second embodiment in which the bypass is not mounted on the deformable detector member 4. In this embodiment, the endpiece 44 of the deformable detector member 4 is provided directly with position detector means, e.g. in the form of a magnet 61 that is detected by a detector unit 6. The data relating to the position of the endpiece 44 is sent to the bypass, which, in this embodiment, is also formed by a core 51 sliding inside a solenoid 52 against the action of a spring 53. Thus, in the event of a leak being detected in the outlet S, the deformable detector member 4 collapses onto itself, thereby causing the endpiece and its associated magnet 61 to descend. When the predetermined position of the endpiece 44 is detected by the detector means 6, the data is transferred to the bypass 5 that powers the solenoid 52 in such a manner as to move the core 51, and thus establish communication between the inlet and the outlet. The purpose of the FIG. 3 embodiment is to make it understood that the bypass or control means 5 of the valve member is/are not necessarily directly coupled to or mounted on the deformable detector member 4 of the detector means. However, the bypass 5 in this embodiment also forms an integral part of the detector means, since it makes it possible, by virtue of its cyclic repetitive actuation, to determine the presence of a leak.

It should be understood that the leak detector means are only effective for pressure difference values that are relatively small, indeed very small. It is thus possible to detect a leak, or even microleaks, even when the normal flow rate through the valve is very high. The leak detection range is determined firstly by the sensitivity of the detector member 4, and by the stiffness of the valve member 1, and more particularly of its elastically-deformable washer 10. When the pressure difference is too high, as in FIGS. 2B and 2C, the valve member opens, and there is no need to detect such a constraint. In this event, it is preferable for the detector means for detecting a predetermined position of the endpiece 44, not to send a control signal to the bypass, which is nevertheless powered continuously so as to hold the valve open. By way of example, it is possible to prevent such a signal being sent by detecting a predetermined flow rate value by the float means 3 that act as flow-rate control means. By way of example, it is possible to mount a sensor at the float 3, said sensor producing a signal that is sent to the bypass 5 so as to indicate thereto that it does not need to obey the signals sent by the leak detector means. Thus, the valve operates as a conventional valve for pressure difference or flow-rate values that are greater than a certain threshold, and operates as a leak detector for pressure difference and flow-rate values that are situated below a certain threshold. A multifunction valve is thus obtained having some members that are shared in order to achieve both the conventional valve-opening/closing function and also the leak-detection function.

A conventional valve member is adapted to open starting from a pressure difference of 200 millibars. Consequently, the detector member 4 can be selected to be sensitive to 0 to 200 millibars maximum.

In the above description, pressure difference is used. It is also possible to use a volume difference parameter, e.g. for a movable detector member such as the deformable membrane. The signal for powering the solenoid can be sent when the volume of the membrane has decreased to a predetermined value, e.g. a few cubic millimeters ($mm^3$). This enables the leakage rate to be measured from the frequency at which the solenoid is triggered.

The invention claimed is:
1. A fluid-flow control valve comprising:
an inlet (E) for connecting to a feed duct;
an outlet (S) for connecting to an evacuation duct;

a valve member (1) that, at rest, bears against a valve seat (2) in such a manner as to isolate the inlet (E) from the outlet (S); and an actuator means (5, C) for moving the valve member (1), the actuator means comprising:

a chamber (C) that communicates with the inlet (E) via a hole (11) of determined section, the chamber (C) being disposed relative to the valve member (1) on its side facing away from the valve seat (2), in such a manner as to urge the valve member against its seat;

a bypass (5) that connects the chamber (C) to the outlet (S), the bypass being controllable between an open state for passing fluid, and a closed state, the bypass presents a through section that is greater than the through section of the hole (11), so as to cause the pressure in the chamber to drop on opening the bypass; and a fluid-leak detector means (4, 5, 6) that are suitable for detecting a leak downstream from the valve member.

2. The control valve according to claim 1, in which the fluid-leak detector means are coupled to the actuator means of the valve member (5, C), such that the actuator means form an integral part of the detector means when the valve is in leak-detection mode.

3. The control valve according to claim 1, in which the fluid-leak detector means comprise a detector member (4) that is sensitive to the pressure difference between the inlet and the outlet, said detector member being subjected to the pressure existing in the chamber (C), and to the pressure existing in the outlet (S).

4. The control valve according to claim 3, in which the valve member (1) forms a through passage (13) that puts the outlet (S) into communication with the inside of the detector member (4) disposed in the chamber (C).

5. The control valve according to claim 1, in which the detector member (4) comprises an anchor ring (41) that is secured to the valve member (1), an elastically-deformable membrane (42), and an endpiece (44) that is remote from the anchor ring, said endpiece being axially movable relative to the ring by deforming the membrane, the endpiece being provided with detector means (6) that are suitable for detecting a predetermined position of the endpiece (44) and for sending a trigger signal to the bypass (5) so as to bring it into its open state.

6. The control valve according to claim 5, in which the bypass (5) is mounted on the endpiece (44).

7. The control valve according to claim 6, in which the endpiece (44) defines a through orifice (46) that puts the chamber (C) into communication with the outlet (S), the bypass (5) including a ferromagnetic core (51) that is slidably movable in a solenoid (52), the core (51) being suitable for closing the through orifice (46) of the endpiece (44) while the solenoid (52) is not powered, the core (51) being provided with detector means (6) that are suitable for detecting a predetermined position of the core and for sending a signal for powering the solenoid so as to move the core away from the endpiece and thus release the through orifice.

8. The control valve according to claim 1, in which the valve member (1) includes an elastically-deformable washer (10) that is held in stationary manner around its outer periphery, one face of the washer facing both the inlet (E) and the outlet (S), and bearing against the seat (2), while its other face faces the chamber (C), the hole (11) passing through the washer from one face to the other.

9. The control valve according to claim 8, in which the valve member (1) further includes a rigid bushing (12) forming a through passage (13) that puts the outlet (S) into communication with the inside of the detector member (4), the detector member being secured to the bushing (12), the bushing being urged by a spring (14) in such a manner as to push the washer against its seat (2).

10. The control valve according to claim 1, further including flow-rate control means (3) in the outlet (S), the flow-rate control means sending a cut-off signal from the fluid-leak detector means when the flow rate reaches a predetermined value.

11. The control valve according to claim 1, wherein the chamber (C) communicates directly with the inlet (E) via the hole (11).

* * * * *